Jan. 16, 1968
M. E. GRINWALD
3,363,596
DUMP MEANS FOR MACHINE FOR HARVESTING
UNDERWATER PLANT LIFE AND WEEDS
Original Filed June 1, 1961
4 Sheets-Sheet 1
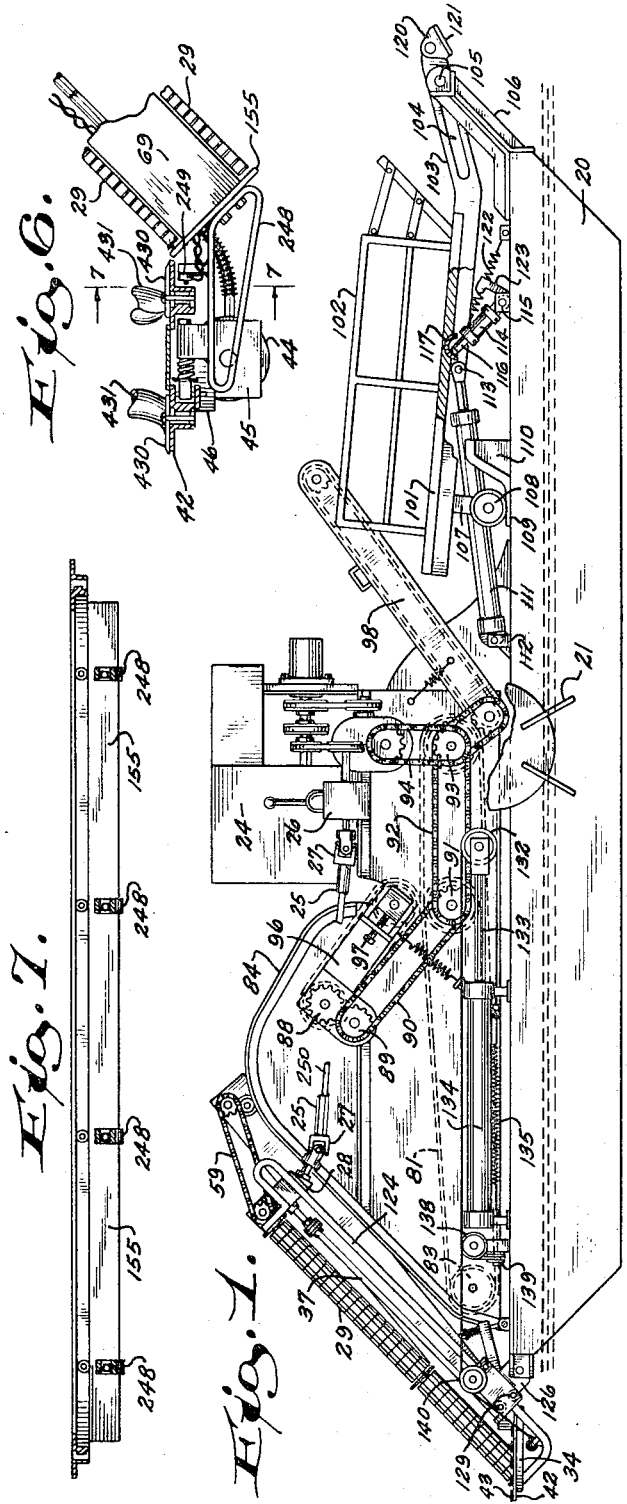
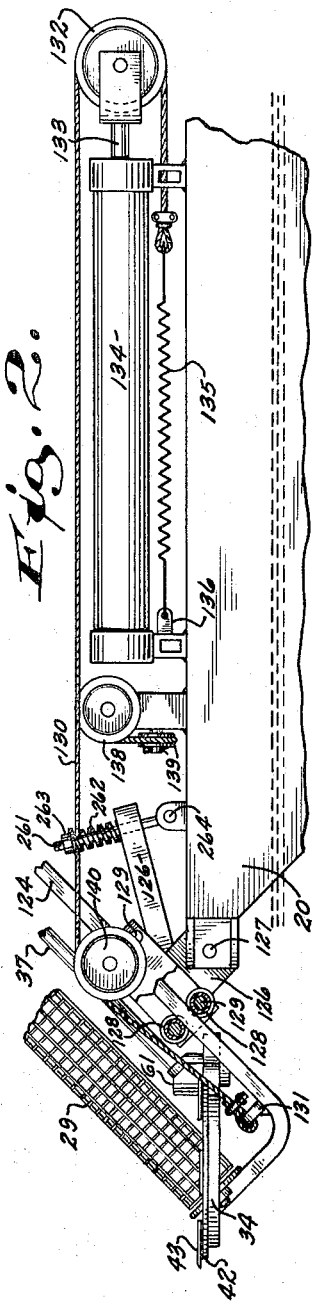
*INVENTOR.*
MATHIAS E. GRINWALD
BY
*ATTORNEYS*

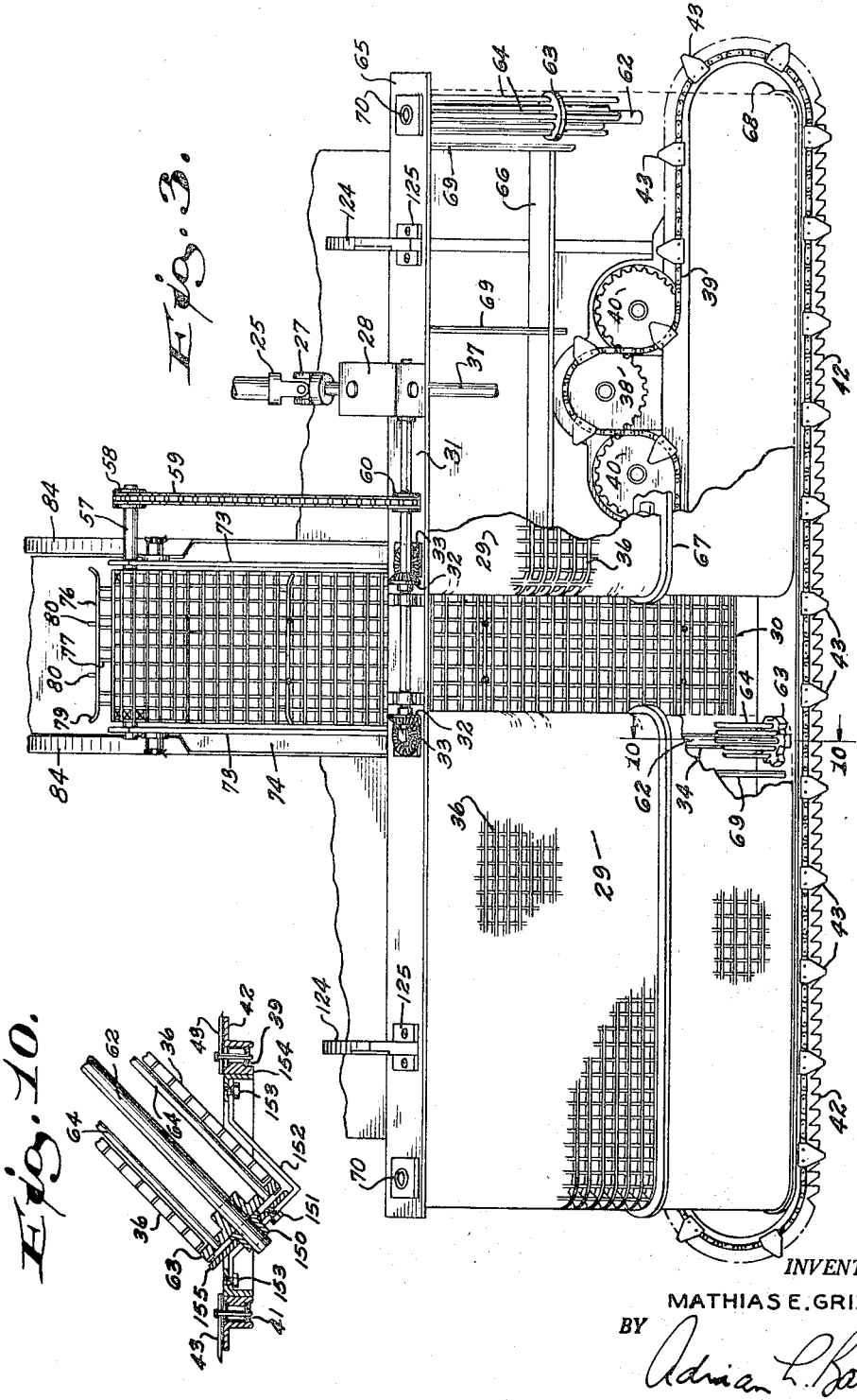

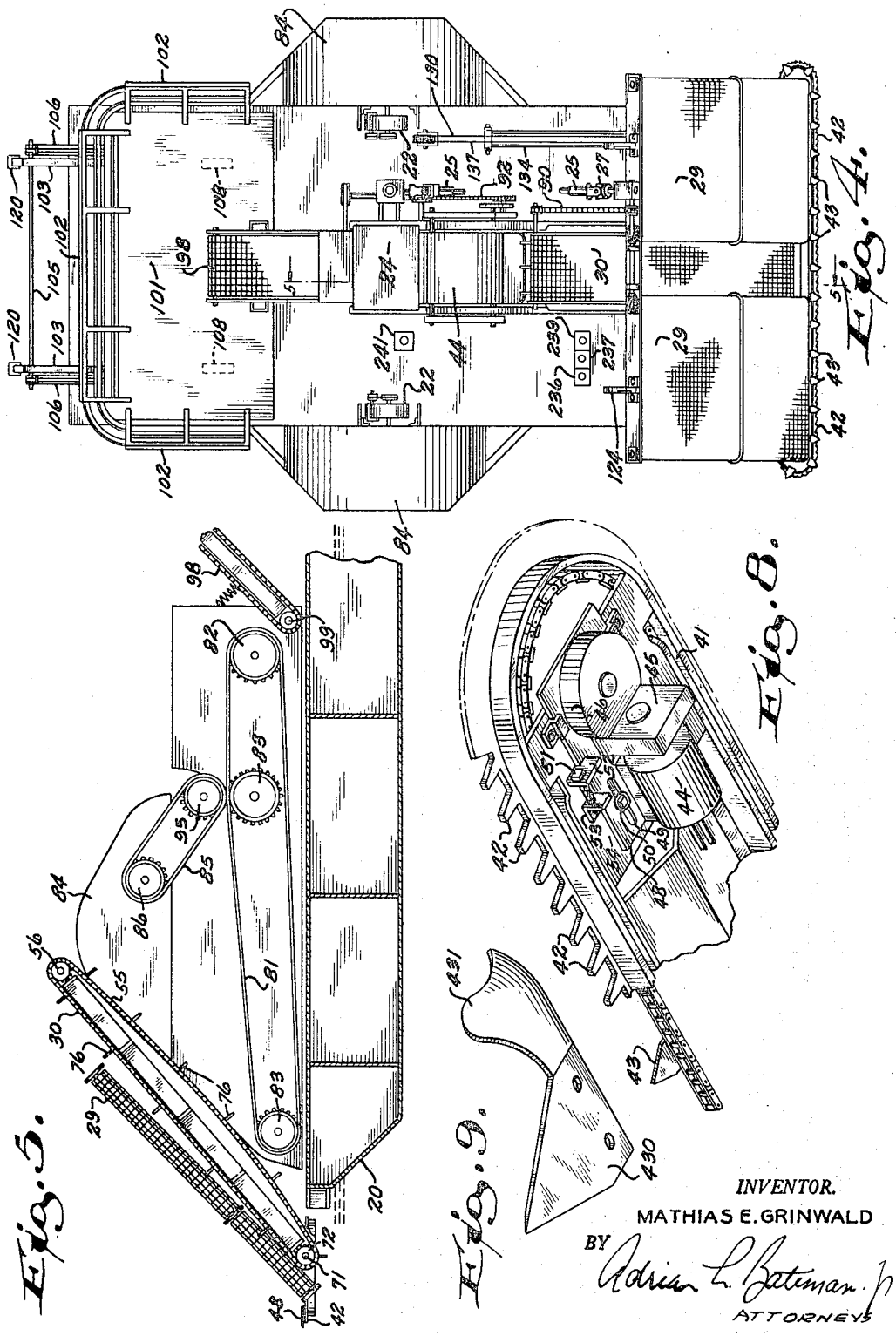

Jan. 16, 1968 M. E. GRINWALD 3,363,596
DUMP MEANS FOR MACHINE FOR HARVESTING
UNDERWATER PLANT LIFE AND WEEDS
Original Filed June 1, 1961 4 Sheets-Sheet 4
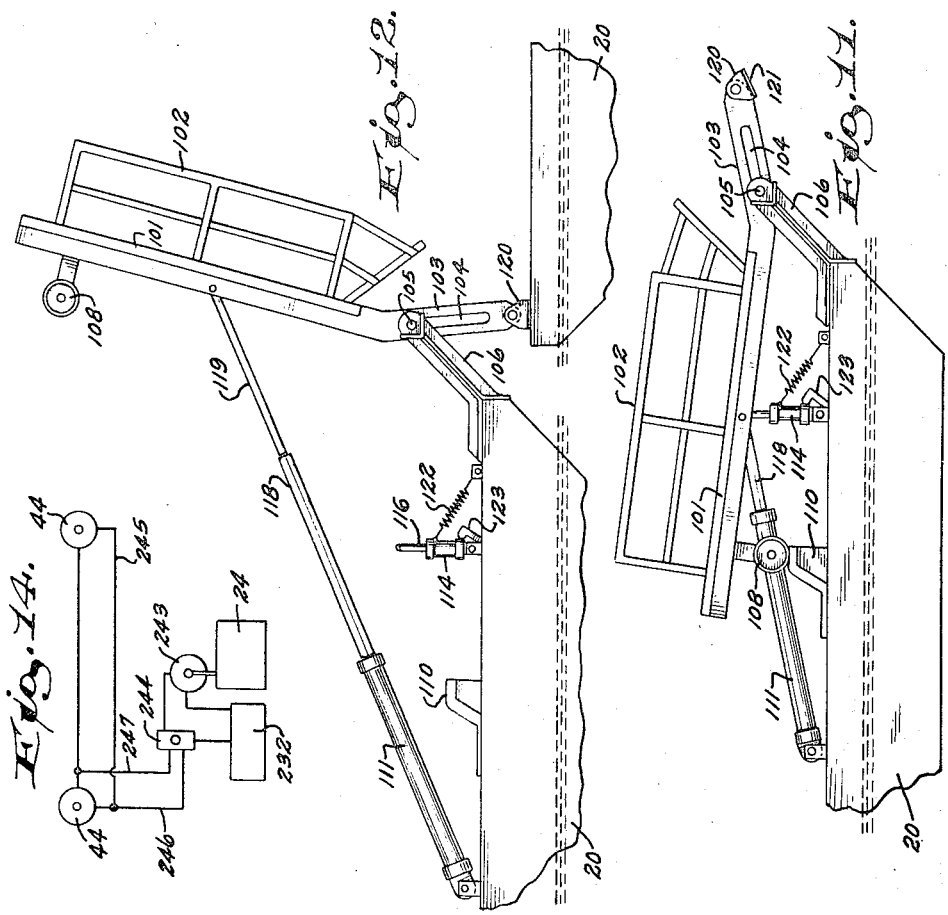
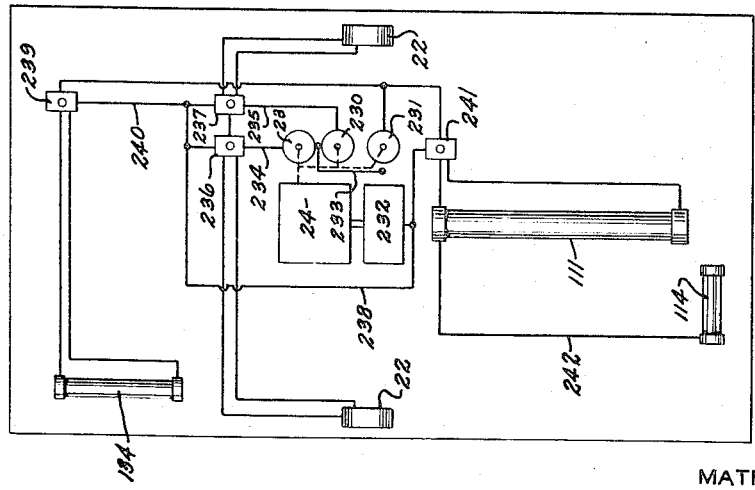
INVENTOR.
MATHIAS E. GRINWALD
BY
ATTORNEYS United States Patent Office 3,363,596
Patented Jan. 16, 1968

3,363,596
DUMP MEANS FOR MACHINE FOR HARVESTING UNDERWATER PLANT LIFE AND WEEDS
Mathias E. Grinwald, Hartland, Wis., assignor, by direct and mesne assignments, to Aquatic Controls Corporation, Hartland, Wis., a corporation of Wisconsin
Original application June 1, 1961, Ser. No. 114,105. Divided and this application Aug. 24, 1966, Ser. No. 581,670
3 Claims. (Cl. 114—32)

ABSTRACT OF THE DISCLOSURE

A dump means for a machine for harvesting underwater plant life and weeds is carried by a hull propelled by side paddle wheels. The forward end of the hull is provided with a driven cutter and a sloping pair of gathering conveyor screens revolving toward each other to feed weeds onto a longitudinal conveyor. From the longitudinal conveyor, the weeds move into a compactor consisting of a pair of angularly related conveyor bands one carrying the weeds and one above the weeds to compress them and drive off the water content. After moving through the compactor the weeds are carried to a hydraulically operated dump platform operated on a lost motion pivot and cam roller arrangement so that the platform is first lifted and moved rearwardly and is then pivoted to dump the weeds from the platform.

This is a division of application Ser. No. 114,105, filed June 1, 1961, now Patent No. 3,286,447.

This invention relates to improvements in machines for harvesting and baling underwater plant life and weeds.

In many lakes underwater weeds and plant life grow so profusely that they render the lakes unusable for boating and swimming. This condition is particularly troublesome in shallow lakes and in the shallow portions of deeper lakes. At some seasons the weeds break loose and float on the surface of the water forming heavy floating masses which make navigation impossible. At the same time, it is difficult and expensive to attempt to dispose of these weeds. The object of this invention is to provide a machine to strip weeds from the bottom of the lake, gather them, compress them, and unload them either to the shore of the lake or to a barge. There they may be converted into feed or fertilizer, or otherwise disposed of. It is a further object to provide such a device which may be handled by a small crew.

The invention consists of a hull propelled by side paddle wheels which may be independently controlled, as described in my Patent 2,488,275. One end of the hull is provided with a cutter and a sloping pair of gathering conveyor screens revolving toward each other to feed the weeds onto a longitudinal conveyor. From the conveyor the weeds move into a compactor and then are carried to a hydraulically operated dump platform supported on a lost motion pivot and cam roller arrangement. The cutter and the gathering assembly may be raised and lowered to meet any conditions of operation or may be withdrawn from the water completely for travel from place to place. The entire cutting, gathering, compressing, and storing operation is continuous, leading to great efficiency in removing weeds from a lake. In particular, the compactor consists of a pair of angularly related conveyor belts, one carrying the weeds and one above the weeds having a free end, to compress them and drive off the water content. The cutters may be mechanically or hydraulically driven. Fins may be provided on the cutters to scare away the fish to avoid harvesting fish with the weeds. These fins also create a current which separates the weeds and raises them for good engagement with the lateral conveyors. The cutters may travel across the entire front of the device, or separate sets may be provided in front of each of the lateral conveyors, as desired.

FIG. 1 is a side view of a weed harvesting machine embodying my invention with portions broken away.

FIG. 2 is a detail view of one side of the lateral conveyor.

FIG. 3 is a plan view of the front of my harvester with portions broken away.

FIG. 4 is a top plan view.

FIG. 5 is a cross-sectional view on line 5—5 of FIG. 4.

FIG. 6 is a detail view of an alternate type of cutter bar and mounting.

FIG. 7 is a cross-sectional view on line 7—7 of FIG. 6.

FIG. 8 is a detail view of the underside of the alternate cutter bar of my invention.

FIG. 9 is a detail view of a modified cutter tooth.

FIG. 10 is a cross-sectional view on line 10—10 of FIG. 3.

FIG. 11 is a view showing the dump platform at the beginning of its cycle of operation.

FIG. 12 is a view showing the dump platform in dumping position.

FIG. 13 is a schematic drawing of the hydraulic circuitry of the harvester.

FIG. 14 is a schematic drawing of the hydraulic circuit for the cutter bar of FIG. 8.

The harvester of my invention comprises a conventional hull 20 provided with paddle wheels 21 driven by hydraulic motor and gear reducer units 22, pressure being supplied by pumps 23 and 230 driven in the conventional manner from engine 24.

The engine drives extensible output shaft 25, 250 which is controlled by a clutch 26 and incorporates universal joints 27, to accommodate changes in the distance and elevation of gear unit 28 from engine 24. The final drive is to a conventional gear unit 28 which drives the lateral horizontal conveyors 29, the weed cutters and the longitudinal conveyor 30.

Lateral conveyors 29 are driven from gear box 28 by a shaft 31 carrying bevel gears 32 which drive bevel gears 33. Each bevel gear 33 is at the top of a respective drive shaft 34 which carries sprockets 35 that mesh with the screen 36 of conveyors 29, and act as spiders to carry support rods 64.

The outer ends of lateral mesh conveyor belts 36 are supported by shafts 62 carrying smooth spiders 63 and support rods 64. As shown in FIG. 10 sprocket 35 rests on bushing 150, which is secured by bolts 151 to bracket 152. Bracket 152 is in turn secured by bolts 153 to main body 154 of the cutter assembly. A chain consisting of links 39 rides in channel 41 of the cutter assembly and carries teeth 43 (or 430) which rest on fixed teeth 42 extending horizontally from the main body of the cutter assembly 154. Bushing 150 is supported by plate 155.

The framework for the lateral conveyors consists of an upper plate 65, inner plates 66 and 67 and bottom plate 68, braced by vertical member 69. The upper end of shaft 62 is supported on plate 65, in bearings 70.

Shaft 37 extends from gear box 28 to gear box 61 containing a set of bevel gears which drive sprocket 38. Sprocket 38 engages a loop of cutter chain 39 between two idler sprockets 40, to drive the chain. Except where chain 39 is looped around sprocket 38 it runs in a channel 41 which positions it with respect to the fixed cutter teeth 42, so that teeth 43 carried by chain 39 occupy the correct relationship to teeth 42 to cut the weeds.

As shown in FIG. 9 cutter teeth 43 may be replaced by teeth 430 which are provided with an upward spoon-shaped extension 431 to create an upward current of water as the chain moves. This performs the dual function of protecting fish in the area and creating upward turbulence in the water which distributes the weeds for efficient pick up by lateral conveyors 29. Former weed harvesters have been objectionable to conservation officials and to the public because of the number of fish which they harvest along with the weeds. This defect is not present in the device of my invention, partly because the travel of the initial conveyor is lateral rather than vertical, and partly because of teeth 430.

FIGS. 6, 7, and 8 show an alternate form of cutter bar in which the drive is by hydraulic motors 44, driving a bevel gear set in cases 45–46, which drives sprocket 47 engaged with chain 39. A similar structure, not shown, drives the other end of the chain. The entire drive unit consisting of the motor, gears, and sprocket is mounted on a plate 48 provided with slots 49 so that the plate may be slid laterally. Precise adjustment of the tension of the chain 39 is achieved by turning bolt 51 in bracket 52 attached to plate 48, bolt 51 being threadedly engaged with a bracket 53 on the main body 54 of the cutter bar, permitting very fine adjustments. The plate is then locked in place by bolts 50.

As shown in FIG. 6, the alternate cutter of FIG. 8 is not mounted around the lower end of conveyor 29 as previously described in connection with the cutter driven by shaft 37, but is mounted on brackets 248 secured to plate 155 of the lateral conveyor assembly 29 for support of the cutter assembly entirely ahead of the lower margin of lateral conveyor 29.

As shown in FIGS. 6 and 7, the cutter bar may be yieldably mounted in front of sealed electric switches 249. Switches 249 are connected in a known manner to a solenoid valve in the hydraulic circuit to motors 44, to shut off the motors upon striking an obstacle.

Between lateral conveyors 29 is a longitudinal conveyor 30 comprising a flexible screen 55 driven by sprockets 56 (FIG. 5) on a shaft 57 (FIG. 3) which is in turn driven by a sprocket 58 and chain 59 from a sprocket 60 on shaft 31.

The lower end of conveyor 30 is carried by shaft 71 and sprocket 72. The framework consists of side frames 73 to assist in guiding the weeds up the conveyor and which carry shafts 57 and 71. Sides 73 are spread apart at 74 in the conventional manner. The mesh conveyor belt 55 is provided with a series of weed retaining members 76, consisting of uprights 77, lateral members 78 having bent up ends to engage and retain the weeds dumped on central conveyor 30 by lateral conveyors 29.

The upper end of longitudinal central elevating conveyor 30 over-lies a longitudinal belt conveyor 81 carried on drive sprocket 82 and idler sprockets 83. The weeds are guided from the discharge end of conveyor 30 to belt 81 by sidewalls 84, which also support the shafts for driving and idler rollers. The upper surface of belt 81 moves rearwardly with respect to hull 20, from a point closely adjacent to the bow and underneath conveyor 30. Masses of weeds deposited on belt 81 are confined between belt 81 and a short conveyor belt 85. Belt 85 is angularly disposed with respect to belt 81, so that as the weeds pass under belt 85 they are progressively compressed. Sprocket 86 drives belt 85, the power being transmitted to shaft 87 by spur gear 88 and spur gear 89 which are in turn driven by chain 90 from sprocket 91. Sprocket 91 is driven by chain 92 from sprocket 93 which is driven by chain 94 from the engine. The lower idler 95 on which belt 85 runs, is supported on side plates 96 which are pivoted about shaft 87 so that the lower end of belt 85 is free to rise and fall according to the demands imposed by the volume of weeds on belt 81. A belt tension adjustment 97 is provided for the shaft carrying idler 95.

After compression of the weeds by belts 85 and 81 the weeds are discharged to a final elevating longitudinal conveyor 98 which is pivoted about shaft 99 and driven by means of a chain 100 driven from the shaft which carries sprocket 93. Because conveyor 98 is free to pivot at its rearward end, it can accommodate itself to the load of weeds accumulating on the dump platform 101 as it fills the platform. Its rearward end is supported by springs 250 which balance its weight and permit it to be adjusted as required.

As shown in FIG. 1 the dump platform 101 carries railings 102 to prevent the weeds from spilling. It is supported at the back by a pair of arms 103 which underlie platform 101 and are slotted at 104 to receive a rod 105 extending laterally of hull 20. Rod 105 is supported on heavy support arms 106. The other end of platform 101 is supported by a pair of legs 107, each of which carries a wheel 108. In the lowered position of the platform wheels 108 rest on flat portions 109 of ramps 110. Hydraulic cylinder 111 is pivoted to a bracket 112 secured to the deck of the hull and to the portion of arm 103 which runs the length of platform 101 at 113. Auxiliary hydraulic cylinder 114 is pivoted to a bracket on the deck at 115 and has a piston rod 116 which bears on a cup 117 secured to platform 101. Upon application of hydraulic pressure simultaneously to cylinders 111 and 114 hydraulic cylinder 111 is unable to supply any substantial lifting force to platform 101 because of the very acute angle which it forms with the platform, but it pushes the platform rearwardly, arm 103 sliding over rod 105 in the process. At the same time cylinder 114 supplies a lifting force to the bottom of platform 101 closely adjacent to the pivot point 113 of cylinder 111. The angle of arm 103 also causes lifting of platform 101 as it slides to the rear on rod 105. When the end of slot 104 reaches rod 105, further backward travel of platform 101 is impossible, but by this time the platform has been substantially lifted by cylinder 114 and slot 104, and in addition wheel 108 has ridden up to the top of ramp 110 to the position shown in FIG. 11. The cylinder 111 is thereupon able to complete the lifting motion about rod 105 as a pivot. As shown in FIG. 12 cylinder 111 may be a compound cylinder having a piston rod element 118 which also serves as a piston and is hollow to receive a further piston rod-piston 119 which is the portion which is pivoted at 113 to member 103.

The end of arm 103 is provided with a pivoted bumper 120 having a resilient pad 121 on its surface to prevent a barge into which the compressed weeds are being dumped from moving away from hull 20, as shown in FIG. 12. Spring 122 between a bracket on the deck and cylinder 114 holds the cylinder against a stop 123 so that upon lowering a platform 101, the cylinder will be in position to engage cup 117. Upon lowering the platform the reverse sequence of the events just described takes place until platform 101 is again in the position shown in FIG. 1.

It is highly desirable to provide a mechanism for raising and lowering the transverse conveyors 29 and the center longitudinal conveyor 30, both to avoid contact with the bottom of the body of water, and to permit the conveyors to be withdrawn from the water for travel from place to place. For this purpose the framework of conveyors 29 and 30 is provided with rails 124 which are curved at their upper ends for fastening at 125 to the top plate 65 of the framework of conveyor 29. As best shown in FIG. 2, the lower end is secured to the lower framework of the lateral conveyors 29. A bracket 126 is secured to hull 20 at pivot point 127. The bracket carries rollers 128 on shaft 129 to guide the conveyor structure. A cable 130 is attached at 131 to bars 124 and extends over an idler sheave 132 mounted on piston rod 133 of cylinder 134. The end of cable 130 is secured to a spring 135 which anchors it to a bracket 136 on the deck of hull 20. A second cable 137, visible only in FIG. 4, is anchored in the same manner as cable 130 but after passing over sheave 132 extends over sheave 138 and sheave 139 and then extends transversely across the front deck to a unit similar to sheaves 139 and 138 (not shown) which again change its direction so that it extends forwardly to a sheave 140 and other mechanism as shown in FIG. 2. Bracket 126 is pivoted at 127 to absorb the shock of contact with the bottom or with concealed sunken objects. Arm 260 on bracket 126 is bored to loosely receive bolt 261. Spring 262 is confined between nut 263 and arm 260 to resiliently support the conveyors and cutters. Bolt 261 is pivoted to hull 20 at 264.

As shown in FIG. 13 the hydraulic system consists of three hydraulic pumps 23, 230, and 231. Pumps 23 and 230 take oil from sump 232 by a common oil line 233 and supply it by separate pressure lines 234 and 235 to valves 236 and 237 which are reversing valves for the respective port and starboard paddle wheel drive motors 22. Return of the oil to sump 232 is by line 238 which also receives oil from other parts of the hydraulic system. Pump 231 supplies pressure through valve 239 to operate double-acting hydraulic cylinder 134 to raise and lower the lateral conveyors 29 and the longitudinal conveyor 30. Return oil is carried by line 240 to line 238 and sent back to sump 232. Pump 231 also supplies through valve 241 to hydraulic cylinders 111 and 114 which are connected to act simultaneously to dump platform 101. On the return stroke, cylinder 111 is double-acting, but cylinder 114 is a single-acting cylinder. As platform 101 settles on the piston rod 116 of cylinder of 114 the hydraulic fluid is forced back through line 242 and valve 241 to return line 238. FIG. 14 shows schematically the additional hydraulic circuit for the purpose of operating the alternate cutter shown in FIG. 7, which is run by hydraulic motors rather than by shaft 37. Engine 24 runs pump 243 which supplies pressure fluid to valve 244. Motors 44 are connected in parallel to rotate whenever valve 244 is open. The return hydraulic fluid flows through lines 245 and 246, through the return side of valve 244, and thence to sump 232. Solenoid valves (not shown) may be added to close line 247 upon actuation of switches 249, and may be of a type which by-pass fluid to return line 246 when closed, to release the pressure. Switch 249 may also be connected to a solenoid which acts on valves 236 and 237 to reverse paddle wheel motors 22. The hull will thus immediately begin backing away from the obstruction. Not only does this prevent mechanical damage but it helps to avoid piling up of weed on the moving parts.

I claim:

1. The sub-combination comprising a dump platform, a rear support for said dump platform adapted to permit pivotal and rearward motion of said platform, means for exerting a force on the front of said platform toward said rear support, and means for elevating said platform upon application of said force to slide said platform rearwardly, said elevating means comprising a hydraulic cylinder pivotally mounted beneath said platform and having a piston rod extending upwardly and forwardly toward said platform, a socket on the underside of said platform to receive the piston rod, a stop mounted to limit rearward pivotal movement of said cylinder, a spring biasing said cylinder for rearward movement, and means to apply pressure to actuate said hydraulic cylinder simultaneously with actuation of the means for exerting a force on the front edge of said platform.

2. The sub-combination comprising a dump platform, a rear support for said dump platform adapted to permit pivotal and rearward motion of said platform, means for exerting a force on the front of said platform toward said rear support, and means for elevating said platform upon application of said force to slide said platform rearwardly, said means for elevating said platform comprising a pivot pin on said rear support, a pair of longitudinally extending slots on said platform to receive said pivot pin, the rear ends of said slots being higher than their front ends, at least one leg at the front edge of the platform, a wheel rotatably mounted on said leg, a ramp behind said wheel, a hydraulic cylinder pivotally mounted beneath said platform and having a piston rod extending upwardly and forwardly toward said platform, a socket on the underside of said platform to receive the piston rod, a stop mounted to limit rearward pivotal movement of said cylinder, a spring biasing said cylinder for rearward pivotal movement, and means to actuate said hydraulic cylinder simultaneously with actuation of the means for moving the platform rearwardly.

3. The device of claim 2 in which the means for exerting a force on the front edge of said platform is a hydraulic cylinder mounted to exert a force which is approximately aligned with the surface of said platform during an initial portion of the dump cycle during which said means for elevating said platform operate, and to exert a generally upward force against a further portion of the cycle to rotate said platform about said pivot pin, and further comprising a pad on the rearmost portion of said platform, said pad being pivotally mounted, and a friction surface on said pad to engage a receptacle and retain it in position to receive the contents of the dump platform.

References Cited

UNITED STATES PATENTS

| 1,152,510 | 9/1915 | Hunt | 298—14 |
| 2,027,421 | 1/1936 | Eisenberg | 214—502 |
| 2,189,052 | 2/1940 | Anthony | 298—175 |

FERGUS S. MIDDLETON, *Primary Examiner.*

MILTON BUCHLER, *Examiner.*

T. MAJOR, *Assistant Examiner.*

UNITED STATES PATENT OFFICE
CERTIFICATE OF CORRECTION

Patent No. 3,363,596            January 16, 1968

Mathias E. Grinwald

It is hereby certified that error appears in the above numbered patent requiring correction and that the said Letters Patent should read as corrected below.

Column 6, line 39, for "against" read -- during --.

Signed and sealed this 25th day of February 1969.

(SEAL)
Attest:

Edward M. Fletcher, Jr.            EDWARD J. BRENNER
Attesting Officer            Commissioner of Patents